Feb. 22, 1944.  A. FRANZ ET AL  2,342,262
ADJUSTABLE REACTION NOZZLE
Filed May 28, 1940

Inventors
Anselm Franz,
Siegfried Decher
By Bailey & Parson
Attorneys

Patented Feb. 22, 1944

2,342,262

UNITED STATES PATENT OFFICE 2,342,262

ADJUSTABLE REACTION NOZZLE

Anselm Franz and Siegfried Decher, Dessau, Germany; vested in the Alien Property Custodian Application May 28, 1940, Serial No. 337,704
In Germany May 30, 1939

7 Claims. (Cl. 60—35.6)

This invention is directed to a reaction or recoil nozzle through which the exhaust gases of an internal combustion engine pass to produce a recoil force which aids in the forward propulsion of a vehicle, as for example, an aircraft. More particularly, the invention is directed to a recoil nozzle which has a variable discharge orifice so that the efficiency of the discharge gases in producing a recoil action is maintained despite changes in atmospheric pressure, and in the velocity of the relative wind.

Recoil nozzles have been developed particularly with respect to aircraft engines, by means of which the gases from the cylinders of the engine are exhausted through a special conduit for each engine cylinder in a direction opposite the movement of the aircraft. In prior known constructions these recoil nozzles were of a fixed construction which could not be adjusted for changes in the physical conditions under which it was operated. The efficiency of a recoil nozzle depends, of course, upon its construction with relation to the pressure of the gases passing therethrough, the pressure of the atmosphere into which the gases are exhausted, and upon the velocity of the relative wind which passes exteriorly of the nozzle and into which the gases are exhausted.

As aircraft are operated at different altitudes and at different speeds, the heretofore known nozzles were efficient for only one predetermined altitude and speed.

It is an object of this invention to produce a recoil nozzle of the type described which can be adjusted so as to function efficiently at different atmospheric pressures.

Another object of the invention is to produce a recoil nozzle of the type described in which the size of the outlet orifice can be varied, so that the efficiency of the nozzle is maintained despite changes in the physical conditions in which it is operated.

Another object of the invention is to produce a recoil nozzle in which the outflow of gas through the nozzle can be maintained at the highest velocity over the greatest period of time possible.

Another object of the invention is to produce a recoil nozzle for an internal combustion aircraft engine in which the efficiency of the nozzle is maintained by automatically adjusting the nozzle to compensate for changes in the altitude and speed at which the aircraft is flying.

Another object of the invention is to produce a recoil nozzle in which the ratio between the gas inlet and discharge orifices of the nozzle can be automatically increased with a decrease in atmospheric pressure into which the gases are discharged, and decreased with an increase of the relative wind into which the gases are discharged.

Generally, these objects are obtained by providing a recoil nozzle with an outlet orifice which is adjustable as to size. It has been discovered that by varying the ratio between the areas of the discharge and inlet orifices of the nozzle such that the ratio increases with an increase in aircraft flying altitude, and decreases as the speed of the relative wind increases, the nozzle can discharge the gases with a substantially constant maximum recoil efficiency. The adjustment may be easily obtained by utilizing a member which is sensitive to change in barometric pressure and the pressure of the relative wind, these changes being used to actuate the adjustable orifice. For example, a Venturi tube may be used in combination with a spring balanced piston as the instrument sensitive to the changes in the physical conditions, and these changes may be used to actuate a shutter for varying the opening of the discharge orifice of the nozzle.

The means by which the objects of this invention may be obtained are more fully disclosed in the accompanying drawing in which:

Fig. 1, diagrammatically, is a cross-sectional view of a recoil nozzle of unvariable shape attached to a cylinder of an internal combustion engine.

Figure 4:
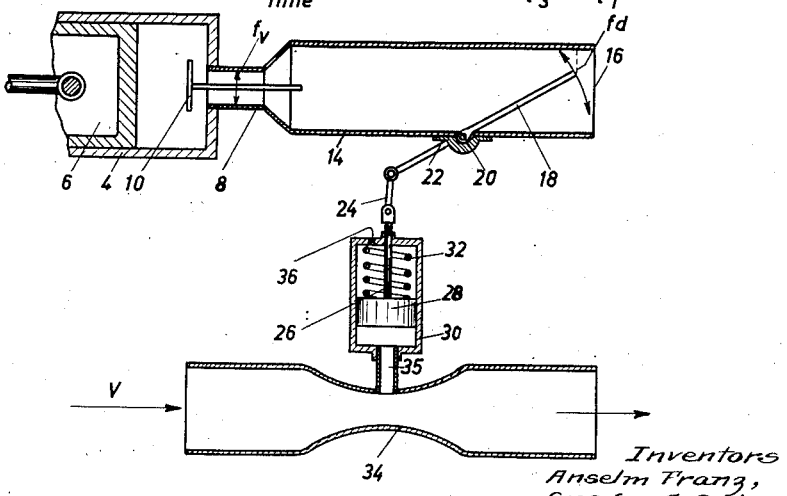

Fig. 4, diagrammatically, is a cross-sectional view of a recoil nozzle having a discharge orifice constructed according to this invention.

Figure 1:
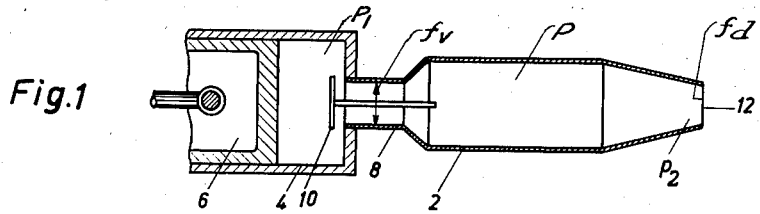

In Fig. 1 a recoil nozzle 2 is shown attached to a cylinder 4 of an internal combustion engine within which is the conventional piston 6. The gases enter the nozzle 2 through throat 8 in which an exhaust valve 10 is diagrammatically indicated. The gases are exhausted from the nozzle 2 into the atmosphere through the orifice 12 which, in this nozzle, of invariant cross-section. In the discharge of the gases from the cylinder 4 through the nozzle 2 into the atmosphere, the gases are exhausted from the combustion chamber at a variable pressure $P_1$, through the throat 8 into the nozzle 2 where the gases have a variable pressure P. The gases are exhausted from the the nozzle 2 through the orifice 12 into the atmosphere. The quantity of gas entering nozzle 12 is dependent upon the pressure P and on the cross-sectional area $f_v$ of the throat 8. The quantity of gas passing through orifice 12 is dependent upon the atmospheric pressure $P_2$ adjacent the orifice. The discharge end of the nozzle 2, containing orifice 12, has different shapes all depending upon the relationship between the pressure of the atmosphere and the pressure P in the nozzle. For example, the nozzle may have the shape disclosed in Fig. 1 if the pressure ratio $P_2/P$ is hypercritical, and the cross-sectional area $f_d$ of orifice 12 then serves as the critical discharge dimension of the nozzle. If the pressure ratio $P_2/P$ is sub-critical, a Venturi discharge nozzle would be used, and the cross-sectional area of its end would be the critical area.

The pressure P in nozzle 2 periodically varies as the gases are forced from the combustion chamber into the nozzle, and the degree of variation depends upon changes in the cross-sectional area ratio $f_d/f_v$. Furthermore as may be seen from Fig. 1, during the exhaust period, that is when valve 10 is open, a greater quantity of gas will enter nozzle 2 than can be discharged therefrom during the same period of time. Of course, discharge from nozzle 2 continues when exhaust valve 10 is closed and does not stop until P and $P_2$ are equalized. Consequently, the variation of pressure P within the nozzle 2 is also dependent upon $P_2$. The velocity of the discharge of the gases through orifice 12 is dependent primarily upon the ratio $P_2$ to P. It is apparent that for aircraft engines the pressure $P_2$ varies inversely as the altitude at which the engine is being operated.

Figure 2:
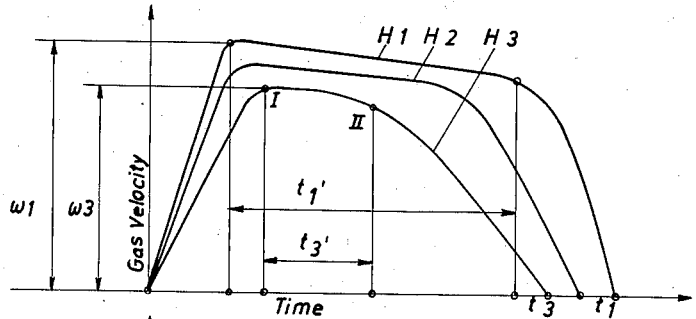
Fig. 2 is a graph disclosing the effect of changes in the atmospheric pressure into which the gases from the nozzle of Fig. 1 are discharged, upon the velocity and time of discharge of the gases from the nozzle.

Thus a nozzle which has a fixed ratio of $f_d/f_v$ will not operate the same at all altitudes. This is graphically demonstrated in Fig. 2 wherein the velocity of discharge of the gases from a nozzle over a period of time is shown for three different altitudes. The curve $H_1$ shows the velocity of the gas passing through orifice 12 plotted against the time of discharge for the highest altitude. The curves $H_2$ and $H_3$ disclose the discharge of the gas from the same nozzle at successively lower altitudes. It is thus seen that at the lowest altitude $H_3$, the gas maintained a substantially constant velocity $w_3$ only between the points I and II during the time $t_3'$. The same nozzle operated at the highest altitude $H_1$ maintained a higher velocity $w_1$ over a longer period of time $t_1'$.

As it is desirable to maintain a substantial constant velocity of the gases discharged from the nozzle during as long a time as possible, it is clear that it is necessary to change the nozzle as the atmospheric pressure $P_2$ changes, as occurs at different altitudes. Changing of the size of the discharge orifice 12 will change the relationship $f_d/f_v$ which accordingly changes the ratio between P and $P_2$. Consequently as the altitude increases, the cross-sectional area ratio $f_d/f_v$ must be increased.

Figure 3:
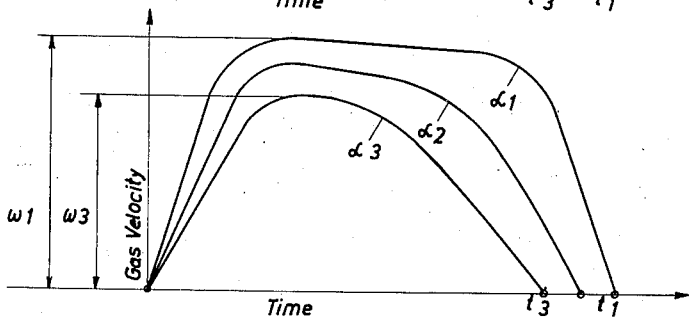
Fig. 3 is a graph disclosing the effect of changes in the size of the discharge orifice of the nozzle upon the velocity and time of the discharge of the gases from the nozzle.

The maximum dynamic efficiency of a reaction nozzle is dependent upon the velocity of the gases discharged from the reaction device with respect to the speed of the relative wind passing the exhaust nozzle 1, the latter of course, being essentially determined by the velocity of the aircraft. As aircraft fly at different speeds, it is apparent that the discharge velocity $w$ of the exhaust gases must be varied in order to maintain the maximum dynamic efficiency of the nozzle. Fig. 3 illustrates the effect upon the discharge velocity of the exhaust gases when the ratio $a=f_d/f_v$ is varied. The curves $a_1$, $a_2$, $a_3$ represents the effect upon the discharged velocity $w$ over a period of time when the aircraft is traveling at the same speed and at a constant altitude, the area of the discharge orifice being varied. The curve $a_1$ represents the least cross-sectional area of $f_d/f_v$ and shows that at this ratio the discharge velocity $w_1$ of the gases through the outlet orifice of the nozzle is the greatest over the longest period of time $t_1$. Both the time of the discharge and the velocity of gases decreases with increase of cross-sectional area ratio $f_d/f_v$. Consequently, the cross-sectional area ratio must decrease as the speed of the aircraft increases in order to maintain the maximum dynamic efficiency of the recoil nozzle.

An apparatus for varying the relationship between $f_d/f_v$ so that the ratio can be increased for an increase in altitude or decrease of $P_2$, and decreased upon an increase of flying speed, is shown in Fig. 4. The nozzle 14 has an unconstricted opening 16 into the atmosphere. The discharge orifice is obtained by means of a shutter 18 which may be hinged at 20 to nozzle 14. This shutter is operated through a crank 22 attached to an arm 24, and to the connecting rod 26 of a piston 28 mounted in a cylinder 30. A spring 32 of a predetermined pressure is mounted on one side of piston 28, while the other side of piston 28 communicates with the pressure of the atmosphere and of the relative wind V through venturi 34 and a connecting tube 35. The spring loaded end of piston 28 communicates with the atmosphere through a port 36.

It is apparent that as the shutter 18 is moved by piston 28, the cross-sectional area $f_d$ of the discharge orifice of nozzle 14 will be varied.

In accordance with the requirements as illustrated by the graph of Fig. 3, when the velocity of the relative wind V increases, if the speed of the aircraft is increased, the pressure in the tube 35 decreases, the piston 30 is urged downwardly by the spring 32, and the shutter 18 rises to decrease the cross-sectional area $f_d$ and thus to decrease the ratio $f_d/f_v$, in order to maintain the gas velocity $w$, the greatest for the longest period of time as illustrated for the curve $a_1$, Fig. 3.

The apparatus of Fig. 4 is merely illustrative of one form of apparatus which can satisfy the requirements of maintaining the proper ratio $f_d/f_v$, which is preferably within the limits 0.4 to 1.6.

It is therefore apparent that the invention maintains the maximum efficiency of the recoil nozzle despite changes in the physical conditions under which it is operating, and that this change is effected by making the cross-sectional area $f_v$ upon which depends the amount of gas entering the exhaust nozzle per unit of time, proportional to the cross-sectional area $f_d$ of the discharge orifice upon which depends the amount of gas discharged from the nozzle per unit of time. The device increases this proportion or ratio as the altitude of the aircraft increases, and decreases the ratio as the speed of the aircraft increases. Continuous and automatic regulation of the $f_d/f_v$ ratio is obtained to keep the recoil nozzle working at maximum efficiency.

Having now described the means by which the object of the invention are obtained, we claim:

1. In combination with a recoil exhaust nozzle for an aircraft engine, which is adapted to propel an aircraft at different altitudes and speeds, means for varying the area ratio between the inlet and discharge orifices of said nozzle comprising means responsive to both changes in barometric pressure and the velocity of the relative wind for increasing said ratio upon an increase in altitude, and for decreasing said ratio upon an increase in the velocity of the relative wind.

2. In a recoil nozzle for discharging the exhaust gases of an internal combustion engine, means for varying the area of the discharge orifice of said nozzle with respect to the inlet orifice thereof comprising shutter means adjacent the discharge end of said nozzle, and means responsive to a decrease in barometric pressure for actuating said shutter means to increase the area of said discharge orifice, and responsive to an increase of the relative wind passing said nozzle to decrease the area of said discharge orifice.

3. In a recoil nozzle as in claim 2, said responsive means including means for actuating said shutter means within a ratio of discharge orifice area to inlet orifice area of 0.4 and 1.6.

4. In an aircraft internal combustion engine having a plurality of cylinders, the combination with each cylinder of a gas discharge nozzle to utilize the discharge gases in providing recoil reaction to assist in driving the aircraft, and automatic means responsive to changes in the atmospheric pressure and the relative air velocity at the discharge outlet of said nozzle to regulate the size of the discharge outlet to maintain maximum recoil reaction efficiency.

5. Apparatus as described in claim 4 wherein said automatic means includes a cylindrical member having a spring-weighted piston therein with the cylinder open at one end to atmospheric pressure and at the other end to a pressure which is varied by changes in the speed of the aircraft.

6. A recoil nozzle adapted to discharge exhaust gases from an internal combustion engine into the relative wind comprising a nozzle having an inlet orifice and an outlet orifice, a shutter mounted upon said nozzle adjacent said outlet orifice, and means responsive to the velocity of the relative wind and the atmospheric pressure for actuating automatically said shutter to vary the orifice area ratio of said inlet and outlet orifices whereby the discharge velocity of the gases from said nozzle is maintained at the maximum dynamic efficiency of the nozzle.

7. In combination with a recoil nozzle for an internal combustion engine, said nozzle having an inlet orifice and a discharge orifice for the passage of exhaust gases from said engine, means responsive to atmospheric pressure and to the relative wind velocity for varying the orifice area ratio of said inlet and discharge orifices to increase said ratio upon a decrease in atmospheric pressure, and to decrease said ratio upon an increase in the velocity of the relative wind passing externally of said nozzle.

ANSELM FRANZ.
SIEGFRIED DECHER.